US007308683B2

(12) United States Patent
Johnson (10) Patent No.: US 7,308,683 B2
(45) Date of Patent: Dec. 11, 2007

(54) ORDERING OF HIGH USE PROGRAM CODE SEGMENTS USING SIMULATED ANNEALING

(75) Inventor: Ross E. Johnson, San Antonio, TX (US)

(73) Assignee: International Business Machines Corporation, Armonk, NY (US)

( * ) Notice: Subject to any disclaimer, the term of this patent is extended or adjusted under 35 U.S.C. 154(b) by 643 days.

(21) Appl. No.: 10/697,491

(22) Filed: Oct. 30, 2003

(65) Prior Publication Data

US 2005/0097546 A1    May 5, 2005

(51) Int. Cl.
  G06F 9/45    (2006.01)
(52) U.S. Cl. .................. 717/158; 717/159; 717/161
(58) Field of Classification Search ........... 717/158, 717/159, 161, 156; 718/101, 100, 105; 711/147, 117; 719/316
See application file for complete search history.

(56) References Cited

U.S. PATENT DOCUMENTS

| | | | | |
|---|---|---|---|---|
| 5,649,198 A * | 7/1997 | Shibata et al. | ............... | 718/100 |
| 5,768,500 A * | 6/1998 | Agrawal et al. | ............... | 714/47 |
| 5,963,875 A * | 10/1999 | Go | ............... | 455/564 |
| 5,963,975 A * | 10/1999 | Boyle et al. | ............... | 711/147 |
| 6,070,009 A * | 5/2000 | Dean et al. | ............... | 717/130 |
| 6,092,180 A * | 7/2000 | Anderson et al. | ............... | 712/200 |
| 6,106,573 A * | 8/2000 | Mahalingaiah et al. | ............... | 717/128 |
| 6,237,059 B1 * | 5/2001 | Dean et al. | ............... | 711/100 |
| 6,332,178 B1 * | 12/2001 | Dean et al. | ............... | 711/118 |
| 6,374,367 B1 * | 4/2002 | Dean et al. | ............... | 714/37 |
| 6,578,068 B1 * | 6/2003 | Bowman-Amuah | ............... | 709/203 |
| 6,715,145 B1 * | 3/2004 | Bowman-Amuah | ............... | 718/101 |
| 6,763,452 B1 * | 7/2004 | Hohensee et al. | ............... | 712/227 |
| 6,779,107 B1 * | 8/2004 | Yates | ............... | 712/229 |
| 6,941,545 B1 * | 9/2005 | Reese et al. | ............... | 717/130 |
| 6,971,092 B1 * | 11/2005 | Chilimbi | ............... | 717/158 |
| 6,978,462 B1 * | 12/2005 | Adler et al. | ............... | 719/318 |
| 7,013,456 B1 * | 3/2006 | Van Dyke et al. | ............... | 717/130 |
| 7,137,110 B1 * | 11/2006 | Reese et al. | ............... | 717/158 |

OTHER PUBLICATIONS

Optimization by Simulated Annealing, S. Kirkpatrick et al, Science, May 1983, pp. 671-680 partial page.*
Experiments with Simulated Annealing, Surendra Nahar et al, IEEE, 1985, pp. 748-752.*
Enhanced Simulated Annealing for Automatic Reconfiguration of Multiprocessors in Space, James R. Slagle et al, ACM, 1989, pp. 401-408.*
Simulated Annealing Past Present and Future, Mark Fleisher, 1995, pp. 155-161.*

(Continued)

Primary Examiner—Todd Ingberg
(74) Attorney, Agent, or Firm—Wood, Herron & Evans, LLP (57) ABSTRACT

An apparatus, program product and method utilize a heuristic-based algorithm such as simulated annealing to order program code segments in a computer memory to provide improved computer performance in terms of memory access, e.g., by minimizing cache misses or other memory-related performance penalties that may be present in a multi-level memory architecture. Program code is ordered in a computer memory by selecting an ordering from among a plurality of orderings for a plurality of program code segments using a heuristic algorithm, and ordering the plurality of program code segments in a memory of a computer using the selected ordering.

23 Claims, 4 Drawing Sheets

OTHER PUBLICATIONS

Shade: A Fast Instruction-Set Simulator for Execution Profiling, Robert F. Cmelik et al, 1993, 41 pages.*

"Profile-Directed Restructuring of Operating System Code", W.J. Schmidt et al, IBM System Journal, vol. 37, No. 2, 1998, pp. 270-297.*

W. J. Schmidt et al., "Profile-Directed Restructuring of Operating System Code," IBM Systems Journal, vol. 37, No. 2, 1998, pp. 270-297.

* cited by examiner

ORDERING OF HIGH USE PROGRAM CODE SEGMENTS USING SIMULATED ANNEALING

FIELD OF THE INVENTION

The invention relates to computers and computer software, and in particular, to the ordering of program code segments in a computer memory to optimize computer performance.

BACKGROUND OF THE INVENTION

Computer technology continues to advance at a remarkable pace, with numerous improvements being made to the performance of both microprocessors—the "brains" of a computer—and the memory that stores the information processed by a computer.

In general, a microprocessor operates by executing a sequence of instructions that form a computer program. The instructions are typically stored in a memory system having a plurality of storage locations identified by unique memory addresses. The memory addresses collectively define a "memory address space," representing the addressable range of memory addresses that can be accessed by a microprocessor.

Both the instructions forming a computer program and the data operated upon by those instructions are often stored in a memory system and retrieved as necessary by the microprocessor when executing the computer program. The speed of microprocessors, however, has increased relative to that of memory devices to the extent that retrieving instructions and data from a memory can often become a significant bottleneck on performance. To decrease this bottleneck, it is desirable to use the fastest available memory devices possible. However, both memory speed and memory capacity are typically directly related to cost, and as a result, many computer designs must balance memory speed and capacity with cost.

A predominant manner of obtaining such a balance is to use multiple "levels" of memories in a memory architecture to attempt to decrease costs with minimal impact on system performance. Often, a computer relies on a relatively large, slow and inexpensive mass storage system such as a hard disk drive or other external storage device, an intermediate main memory that uses dynamic random access memory devices (DRAM's) or other volatile memory storage devices, and one or more high speed, limited capacity cache memories, or caches, implemented with static random access memory devices (SRAM's) or the like. In some instances, instructions and data are stored in separate cache memories to permit instructions and data to be accessed in parallel. One or more cache memory controllers are then used to swap the information from segments of memory addresses, often known as "cache lines", between the various memory levels to attempt to maximize the frequency that requested memory addresses are stored in the fastest cache memory accessible by the microprocessor.

Whenever a memory access request attempts to access a memory address that is not cached in a cache memory, a "cache miss" occurs. As a result of a cache miss, the cache line for a memory address typically must be retrieved from a relatively slow, lower level memory, often with a significant performance penalty. Furthermore, typically any existing data in the cache that "maps" to the same area of the cache (typically referred to as a "cache entry") must be written back to a lower level memory or discarded. Furthermore, if the existing data that has been removed from the cache is later needed, another cache miss will occur, resulting in that data replacing whatever data is currently stored in the same cache entry.

As a result, it is often desirable for performance reasons to minimize the frequency of cache misses that occur during operation of a computer, also referred to as maximizing the "hit rate" of a cache.

From the perspective of program instructions, one manner in which the hit rate of a cache can be impacted is based upon the organization of such program instructions in a memory address space. In particular, if different segments of a computer program are arranged in particular segments of the memory address space that map to the same entry in a cache, and those different segments are frequently executed by a computer (perhaps in parallel, or in an alternating fashion), the execution of instructions may result in a substantial number of cache misses, e.g., due to instructions from each segment having to be repeatedly swapped in and out of the cache as they are needed for execution. The resulting conflict is often referred to as a "hot spot" in the cache.

If the conflicting segments of the computer program were mapped to different cache entries, there would be a greater probability that the frequently needed instructions from both segments could reside in the cache at the same time, thus avoiding many of the cache misses that otherwise would have occurred.

As a result, simply the organization of program code segments in the memory address space can have a significant impact on system performance, particularly for frequently-executed program code. Of note, in many instances, the precise ordering of segments of program code in a memory address space is not relevant to the functions provided by the program code. Put another way, the program code segments in many types of computer programs would operate in the same manner from a functional standpoint regardless of their locations in memory relative to one another.

Developers have attempted to take advantage of this flexibility by attempting to organize program code segments in memory in such a manner that hot spots are minimized wherever possible. Empirical testing or simulation may be performed on different arrangements of program code to attempt to find an optimal solution having the highest hit rate, and thus least amount of cache misses, during operation of a computer upon which the program code is installed.

One drawback to conventional testing and simulation, however, is that in many instances the number of potential arrangements of program code can be too numerous to effectively analyze all possible arrangements. For example, for some computer program code, such as the program code in a complex operating system, the number of segments, or modules, of program code for which it may be desirable to arrange so as to address memory access-related performance degradation issues can be in the hundreds of modules. Even 100 modules provide 100! or $9.3 \times 10^{157}$ possible orderings of modules, so as the number of modules increases, the number of possible orderings quickly becomes impractical to analyze, even with the fastest of computers.

Therefore, a significant need exists in the art for an improved manner of testing and selecting optimal orderings of program code segments to minimize memory access-related performance issues due to cache hot spots and the like resulting from execution of such program code segments in a computer implementing a multi-level memory architecture.

SUMMARY OF THE INVENTION

The invention addresses these and other problems associated with the prior art by providing an apparatus, program product and method that utilize a heuristic-based algorithm to order program code segments in a computer memory to provide improved computer performance in terms of memory access, e.g., by minimizing cache misses or other memory-related performance penalties that may be present in a multi-level memory architecture. In particular program code is ordered in a computer memory by selecting an ordering from among a plurality of orderings for a plurality of program code segments using a heuristic algorithm, and ordering the plurality of program code segments in a memory of a computer using the selected ordering.

In some embodiments consistent with the invention, a heuristic algorithm such as simulated annealing is used to progressively reach an optimized ordering without having to test all possible orderings. As a result, optimized orderings may be obtained even for sets of program code segments where it is impractical to test all possible orderings due to a relatively large number of program code segments. Furthermore, a heuristic algorithm incorporating simulated annealing techniques may incorporate some degree of randomness to reduce the likelihood of converging to a local solution that is not optimal from a global standpoint.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments discussed hereinafter utilize a heuristic algorithm such as simulated annealing to order program code segments in a computer so as to optimize performance of the computer, e.g., by minimizing cache misses resulting from execution of the program code segments.

A heuristic-based ordering of program code segments progressively reaches an optimized ordering through the selection and testing of different possible orderings among the set of all available orderings. Typically, an acceptable solution is obtained without having to test all possible orderings. As a result, by the use of a heuristic algorithm, optimized orderings may be obtained even for sets of program code segments where it is impractical to test all possible orderings due to a relatively large number of program code segments. Moreover, by using a heuristic algorithm such as simulated annealing or another algorithm that relies on a degree of randomness, the likelihood of converging to a local solution that is not globally optimal may be reduced.

Ordering of program code segments ultimately results in the placement of program code segments in a particular order in a memory address space, be it effective (virtual) or real. However, as will become more apparent below, such ordering may result in nothing more than the generation of an ordered list that is processed at a later time by other program code used to assign memory address ranges and/or actually load such program code segments into memory. In other embodiments, however, such ordering may occur at other times, e.g., prior to compilation of the program code segments into one or more executable files.

Typically, optimization of the performance of the computer is achieved through minimizing cache misses resulting from execution of multiple program code segments in a computer program, e.g., a computer operating system. However, it will be appreciated that the invention may apply to other memory-related performance issues, e.g., minimizing translation lookaside buffer (TLB) misses, minimizing page swapping, etc.

Figure 1:
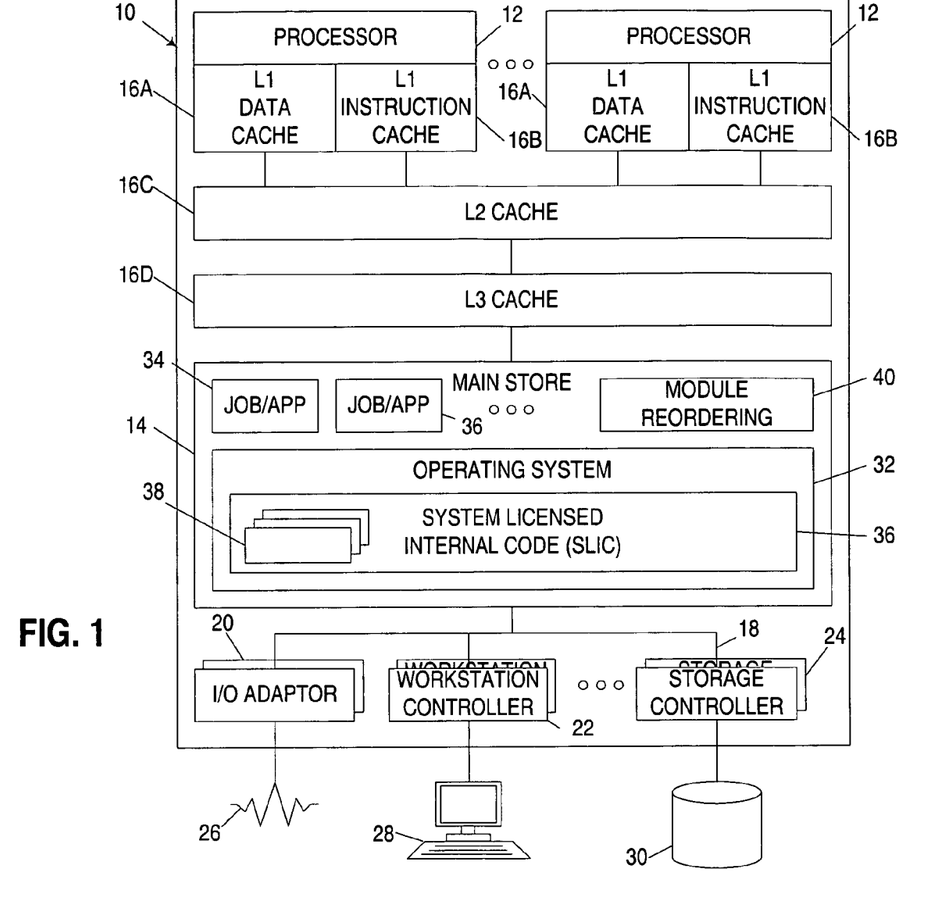
FIG. 1 is a block diagram illustrating the principal hardware and software components in a computer incorporating heuristic-based ordering of program code segments consistent with the invention.

Turning now to the Drawings, wherein like numbers denote like parts throughout the several views, FIG. 1 illustrates a computer 10 capable of performing heuristic-based program segment ordering consistent with the invention. Computer 10 generically represents, for example, any of a number of multi-user computers such as a network server, a midrange computer, a mainframe computer, etc., e.g., an AS/400 or eServer iSeries midrange computer. However, it should be appreciated that the invention may be implemented in other computers and data processing systems, e.g., in single-user computers such as workstations, desktop computers, portable computers, and the like, or in other programmable electronic devices (e.g., incorporating embedded controllers and the like).

Computer 10 generally includes one or more system processors 12 coupled to a main memory, or main store 14, through one or more levels of cache memory disposed within a cache system represented at 16A-16D. Furthermore, main storage 14 is coupled to a number of types of external devices via a system input/output (I/O) bus 18 and a plurality of interface devices, e.g., one or more input/output (I/O) adaptors 20, one or more workstation controllers 22 and one or more storage controllers 24, which respectively provide external access to one or more external networks (e.g., a network 26), one or more workstations 28, and/or one or more storage devices such as one or more direct access storage devices (DASDs) 30. Any number of alternate computer architectures may be used in the alternative.

The aforementioned cache system may incorporate a number of different cache architectures consistent with the invention. For example, computer 10 illustrates a cache architecture relying on split level one (L1) data caches 16A and instruction caches 16B that are dedicated to each processor 12, along with a shared and unified level two (L2) cache 16C and shared and unified level three (L3) cache 16D. It will be appreciated that a cache memory may be resident on the same integrated circuit as a processor, or may be external thereto. Moreover, cache memories may be shared to various extents by multiple processors, and greater or fewer levels of cache memories may be used. Individual cache memories may store data, instructions or both, and may have different sizes and associativities.

Moreover, multiple processor cores may be provided on the same integrated circuit, with one or more levels of cache memories integrated therewith. For example, in the Power4 processor used in some eServer iSeries midrange computers, two processor cores may share the same chip, with dedicated L1 data and instruction caches provided for each processor core, and with an additional L2 cache provided on the chip and shared by both processor cores. Additional cache memories, e.g., an L3 cache, may be provided externally from the chip so that the cache can be accessed by multiple processor chips. As such, for computer 10 of FIG. 1, processors 12, L1 data and instruction caches 16A, 16B, and L2 cache 16C may be disposed on the same chip, with L3 cache 16D disposed on a separate chip.

From a software standpoint, computer 10 typically includes an operating system 32 and one or more jobs or applications 34 capable of accessing the services provided by the operating system. In the illustrated implementation, computer 10 is an eServer iSeries midrange computer, whereby a portion of operating system 32, referred to as system licensed internal code (SLIC) 36, is implemented below a technology-independent machine interface (TIMI) to provide abstract kernel services for the higher levels of the operating system and the jobs and applications executing on the system.

SLIC 36 is typically partitioned into a plurality of modules 38, which, in the illustrated embodiment, are ordered (i.e., assigned effective addresses in the memory space, typically by a SLIC link/loader during startup) in such a manner as to optimize system performance when executing SLIC program code. Typically, modules 38 may include both high-use and low-use modules, and these modules may further be characterized as nucleus modules that are required to remain in the main store 14 at all times, and pageable modules that may be selectively paged out to nonvolatile storage. Furthermore, multiple related modules that are required to be kept together may be grouped into replaceable unit destinations (RUDESTs). Program modules may also be replaced from time to time using Program Temporary Fixes (PTFs).

In the illustrated implementation, only high-use modules 38 are ordered using the heuristic-based ordering routine described hereinafter. Such ordering typically results in the generation of a list that is used by a link/loader to properly order the high-use modules in memory during system startup. It will be appreciated, however, that other subsets of modules may be ordered in the manner discussed herein. Moreover, in some instances, modules may be combined or split up for ordering purposes. Furthermore, other delineations may be used to partition program code into multiple segments. In addition, it will be appreciated that the invention may be utilized in connection with ordering program code segments for other operating system code, for application code, and for practically any program code that may be capable of being executed on a computer. The invention therefore is not limited to the particular implementation discussed herein.

To implement heuristic-based ordering consistent with the invention, a module reordering application 40, illustrated in main store 14, may be used. It should be noted that the illustration of modules 38 and application 40 in the same computer 10 is merely for convenience, as application 40 need not even be executed on the same hardware or software platform as the particular computer for which heuristic-based ordering is being performed.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has, and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Figure 2:
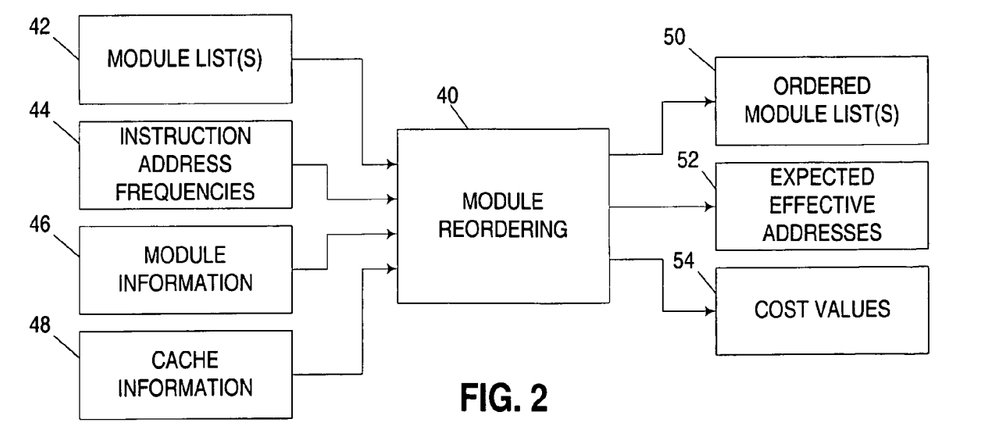
FIG. 2 is a block diagram illustrating the module reordering program referenced in FIG. 1, including the inputs supplied thereto and the outputs generated thereby.

A specific implementation of a heuristic-based ordering algorithm consistent with the invention in FIG. 2, where module reordering component 40 is illustrated along with the expected inputs and outputs generated by the component when implementing the herein-described algorithm in ordering high-use SLIC modules in an iSeries midrange computer. The number of modules in such an implementation may be significant, resulting in an inability to test all possible orderings. For example, if the number of modules being ordered is 690 modules, the number of possible orderings is 690!, or approximately $9 \times 10^{1660}$.

In the illustrated implementation, a high-use module list is used to specify the order of modules in text segments. A simulated annealing algorithm is used to search through the set of possible orderings to find a good or acceptable ordering, referred to herein as an optimized ordering. It has been found that some orderings can be better than others because effective addresses are different in each ordering, resulting in different cache conflicts. The simulated annealing algorithm may be used independently from profiling, or may be performed subsequent to ordering via profiling to optimize the ordering generated through conventional profiling techniques.

As will become more apparent below, the simulated annealing algorithm used in this implementation relies on four functions or decisions that are required to tailor simulated annealing to this particular context. First, a specialized move function is used to determine which ordering to try next. Second, a specialized cost function is used to estimate the caches miss rates for a given module ordering. Third, a specialized acceptance decision is used to determine when to accept an ordering as a potential optimized ordering. Fourth, a specialized termination decision is used to determine when the search for an optimized ordering should be terminated, with an acceptable ordering used as the optimized ordering.

The herein-described implementation, in particular, attempts to optimize the order of high-use SLIC program code modules to minimize the number of instruction misses in a direct-mapped instruction cache and a direct-mapped TLB. Beneficial side effects include a reduction in the instruction cache misses on associative instruction caches and TLB's and to optimize code placement within a page (and between pages for sequentially bolted addresses) to reduce L2 cache misses. It should be noted that, in some implementations, a given module may be larger than the instruction cache, and thus can create a conflict with itself. In such instances, it may be desirable to split large high-use SLIC modules into smaller segments to facilitate optimization.

As shown in FIG. 2, component 40 receives as inputs one or more module lists 42 (e.g., if modules are partitioned into separate high-use and low-use lists), instruction address frequencies 44, module information 46 (e.g., effective address, size, RUDEST, alignment, whether or not the module is fixed), and cache information 48 (e.g., size, line size, associativity, etc. for the L1 instruction cache and/or TLB).

Outputs from component 40 include one or more ordered module lists 50, representing the determined optimized module ordering, expected effective addresses 52, and cost values 54 indicating improvement over the original module ordering. It should be appreciated that expected effective addresses and cost values need not be output from the component in some implementations, and that more detailed information may alternatively be output in other implementations.

As noted above, module reordering component 40 uses a simulated annealing algorithm that attempts to reduce total instruction cache misses, often by spreading hot spots across the cache. Simulated annealing is a form of a heuristic search through all possible module orderings, where some degree of randomness is introduced into the selection of candidates for optimized orderings. Simulated annealing takes advantage of the fact that good solutions (as measured by a cost function to be minimized) tend to be similar. A new solution candidate is generated by tweaking a previously generated candidate that was reasonably good, typically utilizing some degree of randomness in the generation of the candidate; this is referred to herein as a random move.

In the illustrated implementation, a random move function is used to randomize the module order between two random modules (inclusive) within a RUDEST. If cost is reduced, the move is accepted. If cost is increased, then the move is accepted with a probability $\exp(-dc/T)$, where dc is the cost increase, and T is the temperature (discussed in more detail below in connection with FIG. 6). Temperature T begins at some fraction of the original cost, and then is halved after each batch of random moves.

Consistent with annealing theory, a greater cost must sometimes be accepted in order to avoid finding a local minimum and missing a global minimum. There is no guarantee of finding a global minimum, but it has been found that an annealing process has a better chance than a greedy algorithm that never accepts an increased cost.

Also in the illustrated implementation, for each temperature, the maximum module range for reordering is twice the largest range that was accepted for the last temperature (where the initial range is the largest RUDEST). The algorithm terminates when the all accepted moves contain only two modules (a simple swap), this condition persists for two temperatures, and no new "best" orderings are found.

The cost function utilized in the illustrated implementation estimates the total cache misses (for the sample) as follows: Let hit-rate H be the number R of dynamic references for an effective address divided by the total number of dynamic references that map to the same cache line as that effective address. The cost function is $R*(1-H)$ summed over all effective addresses in the entire cache. This function has the intuitive explanation that each of R references to an effective address has a miss rate $(1-H)$ per reference because, in a direct mapped cache, the probability of the effective address being in the cache at any point in time is approximately H.

The benefits of a particular reordering often are based upon the relative ordering of the highest-use modules, as the higher reference rates found for certain modules, the greater the likelihood that these modules will be in the working set (i.e., maintained in the instruction cache). Therefore, desirable results are typically obtained using orderings that separate modules having effective addresses that are frequency referenced during system operation, so that as many of such modules can be retained in a cache at any given time.

Other cost functions may be used in the alternative. For example, a simpler cost function, e.g., based upon the variance of the total number of references in each instruction cache set, may be used. In addition, cache associativity may be modeled in a cost function, e.g., by not counting a miss until the associativity class overflows, and adding additional references to account for data and placement in a cache so that the associativity class overflows at a lower number of unique references. Accounting for associativity, however, can potentially increase the complexity of the heuristic search exponentially, based upon the number of associativity classes.

Figure 3:
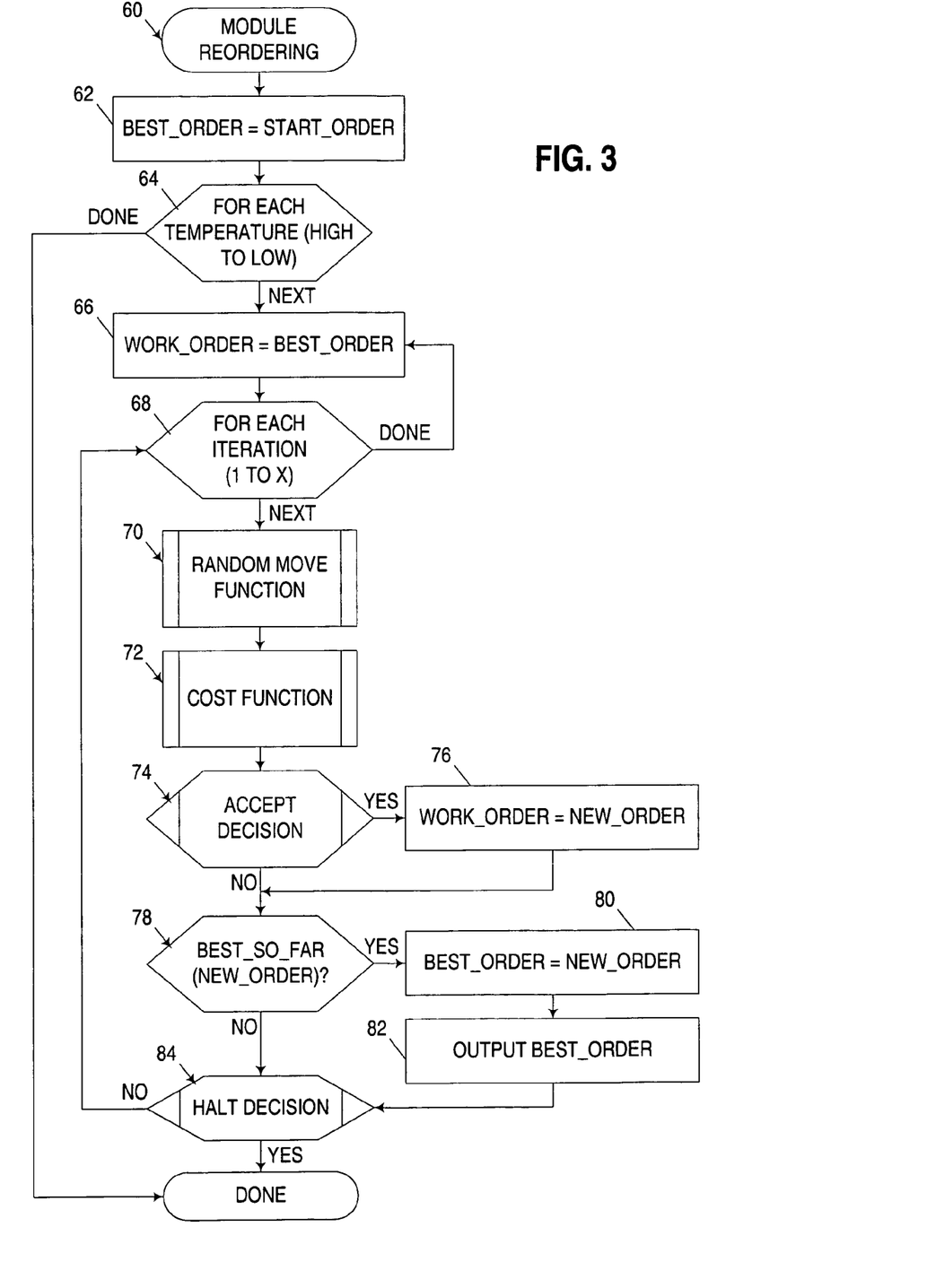
FIG. 3 is a flowchart illustrating the program flow of the module reordering program referenced in FIG. 1.

Now turning to FIG. 3, a module reordering routine 60 that may be executed by component 40 to implement the herein-described module reordering algorithm is illustrated in greater detail. Routine 60 begins in block 62 by initializing a best_order variable to an initial order (e.g., the order provided in the module list input to the routine, referred to as start_order).

Next, block 64 initiates a FOR loop to process a plurality of temperatures in order from a highest temperature to a lowest temperature. For example, the temperatures may be selected among various sequences such as 1, ½, ¼, ⅛, ¹⁄₁₆, . . . , among others. Alternate sequences, including other geometric sequences, as well as non-geometric sequences, may be used in the alternative.

For each temperature, block 64 passes control to block 66 to initially set a work_order variable to the current best_order. Control then passes to block 68 to initiate a second FOR loop to iterate between a value of 1 to X, where X in the illustrated embodiment may be a multiple (e.g., 10) of the number of modules being ordered.

For each such iteration, block 68 calls a random move function 70 to create a new ordering to be tested (referred to herein as "new_order"). Next, a cost function 72 is called for the newly created ordering to determine the performance, or cost of the new ordering. Next, an accept decision function 74 is called to determine whether to accept the new order as a potential best order. If function 74 returns a "YES" result, control passes to block 76 to set the work_order variable to equal new_order. Upon completion of block 76, or if function 74 returns a "NO" result, control passes to block 78 to determine if the new ordering satisfies the conditions for the best order so far.

Block 78 may determine whether the new ordering is the best order so far in a number of manners consistent with the invention. For example, block 78 may determine whether the cost of new_order is less than that of the current best_order.

If new_order is determined to be the best order so far, block 78 passes control to block 80 to set best_order to equal new_order, and then to block 82 to output the best_order, e.g., to a log of best orders that have been generated by routine 60. In addition, along with outputting the ordering, it will be appreciated that block 82 may also output cost statistics to assist the developer in ascertaining the potential performance of the ordering. In the alternative, intermediate results may not be output by routine 60, with only a single ordering output as the result of the routine.

Upon completion of block 82, or if block 78 determines the new order is not the best order so far, a halt decision function 84 is called to determine whether to terminate routine 60. If function 84 returns a "NO" result, control returns to block 68 to process the next iteration of the nested FOR loop. In addition, once each such iteration has been processed, control returns to block 64 to process the next temperature. Upon completion of the FOR loop initiated in block 64, or in response to a "YES" result being returned by function 84, routine 60 is complete.

It will be appreciated that other functionality may be implemented in routine 60, and that other simulated annealing algorithms may be utilized in the alternative. Furthermore, it will be appreciated that different numbers of temperatures, and iterations at each temperature, may be utilized in various embodiments consistent with the invention.

As noted above, functions 70, 72, 74, and 84 respectively implement a random move function, a cost function, an accept decision function, and a halt decision function for the simulated annealing algorithm implemented in routine 60. Specific implementations of these functions and decisions are set forth hereinafter in connection with FIGS. 4-7.

Figure 4:
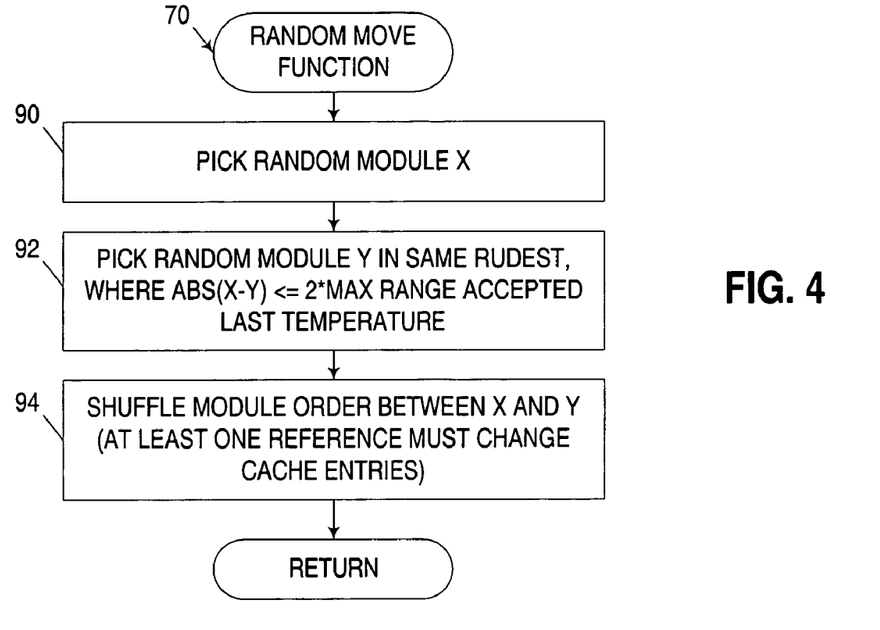
FIG. 4 is a flowchart illustrating the program flow of an exemplary implementation of the random move function referenced in FIG. 3.

One implementation of random move function 70 is illustrated in greater detail in FIG. 4. Routine 70 begins in block 90 by picking a random module X among the modules in the work_order. Next, in block 92, a random module Y, disposed in the same RUDEST, is randomly chosen, with the selection of Y constrained by the absolute value of X−Y being less than or equal to two times the maximum range accepted at the last temperature value.

Next, in block 94, the module order is shuffled between X and Y so that at least one reference in the modules changes cache entries. Control then returns to routine 60.

Figure 5:
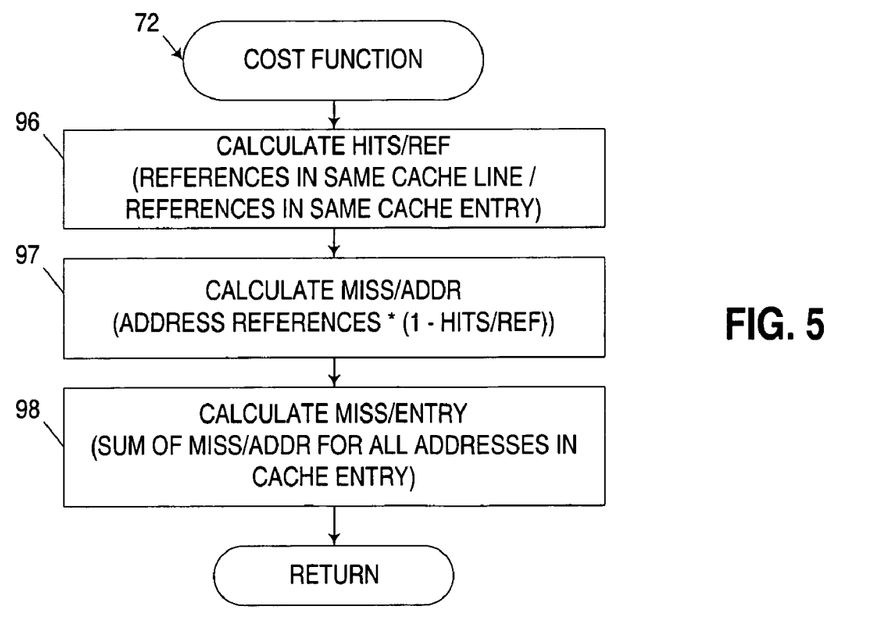
FIG. 5 is a flowchart illustrating the program flow of an exemplary implementation of the cost function referenced in FIG. 3.

FIG. 5 next illustrates one exemplary implementation of cost function 72 in greater detail. Function 72 begins in block 96 by calculating HITS/REF values, each representative of the number of dynamic references for an effective address divided by the total number of dynamic references that map to the same cache line as that effective address. Block 97 then calculates MISS/ADDR values, each of which being the number of references to an address multiplied by (1−HITS/REF). Block 98 then calculates MISS/ENTRY values, each representative of the sum of the MISS/ADDR values for all addresses in a cache entry. Control then returns to routine 60.

It will be appreciated that the cost function described herein assumes a one way instruction cache and TLB. In other embodiments, however, multi-way associative caches and TLBs may be used, with the cost calculated in a manner that would be apparent to one of ordinary skill in the art having the benefit of the instant disclosure.

Figure 6:
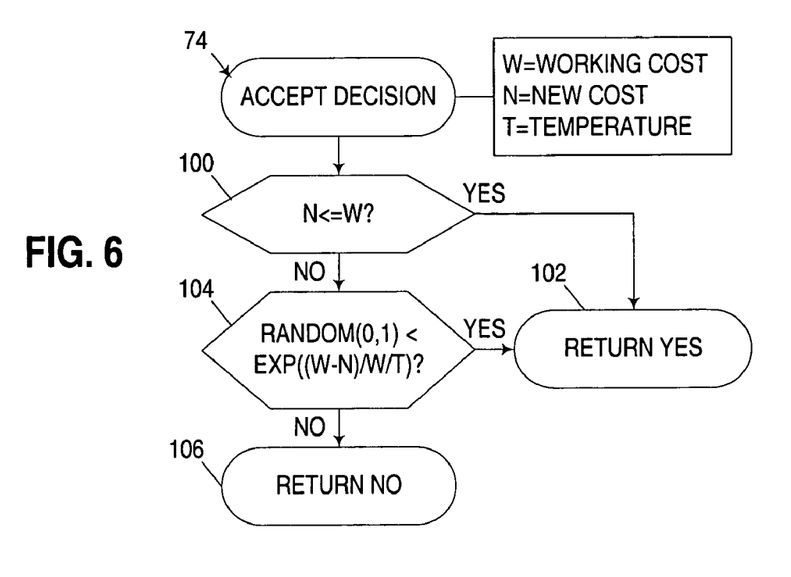
FIG. 6 is a flowchart illustrating the program flow of an exemplary implementation of the accept decision referenced in FIG. 3.

FIG. 6 next illustrates one implementation of accept decision function 74. For this decision, a working cost (W) represents the total cost for the current work_order, with a new cost (N) representing the total cost of the new_order. The total cost of each order may be determined, for example, by summing the MISS/ENTRY values calculated in cost function 72.

Function 74 begins in block 100 by determining if the new cost is less than or equal to the working cost. If so, control passes to block 102 to return a "YES" result, indicating that the new order is accepted. Otherwise, block 100 passes control to block 104 to perform a randomized acceptance of some of the new orders that do not necessarily provide a lower cost than the current work_order. In the illustrated implementation, block 104 determines if a random value between zero and one is less than EXP((W−N)/W/T), where T is the current temperature. Based upon this outcome, control passes either to block 102 to return a "YES" result, or to block 106 to return a "NO" result. It will be appreciated, however, that other randomized functions may be utilized to randomly accept certain new orderings that do not necessarily provide a local optimization over a current work_order.

Figure 7:
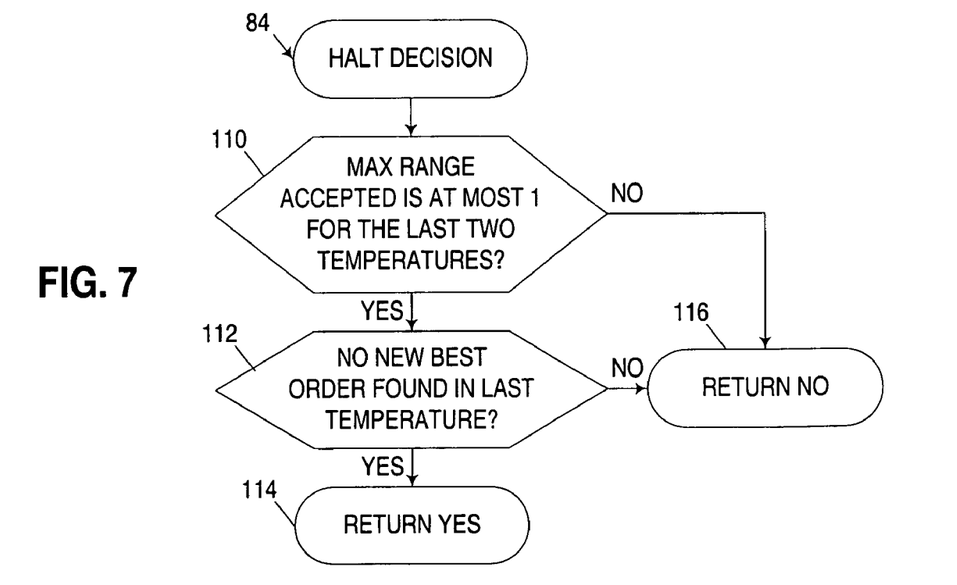
FIG. 7 is a flowchart illustrating the program flow of an exemplary implementation of the halt decision referenced in FIG. 3.

FIG. 7 illustrates one implementation of halt decision 84 in greater detail. Decision 84 implements two queries 110 and 112 that result in the return of a "YES" response that halts the algorithm in block 114 upon the meeting of the two queries. In particular, block 110 determines whether the maximum range accepted is at most one for the last two temperatures. Block 112 determines if no new best_order has been found in the last temperature. If both conditions are met, a "YES" result is returned. Otherwise, control passes to block 116 to return a "NO" result, thus enabling the algorithm to proceed.

Various additional modifications may be made to the illustrated embodiments without departing from the spirit and scope of the invention. Therefore, the invention lies in the claims hereinafter appended.

What is claimed is:

1. A method of ordering program code in a computer memory, the method comprising:
   selecting an ordering from among a plurality of orderings for a plurality of program code segments using a heuristic algorithm, wherein the heuristic algorithm comprises a simulated annealing algorithm, wherein selecting the ordering using the heuristic algorithm includes testing a subset of the plurality of orderings, and wherein testing the subset of the plurality of orderings includes, for each ordering in the subset, calculating a cost for such ordering based upon cache miss rates for such ordering, and randomly selecting a different ordering after testing an ordering from the subset of orderings; and ordering the plurality of program code segments in a memory of a computer using the selected ordering.

2. The method of claim 1, wherein the heuristic algorithm is configured to minimize cache misses in the computer.

3. The method of claim 1, wherein calculating the cost for each ordering comprises calculating a plurality of hits/reference values, misses/address values, and misses/entry values.

4. The method of claim 1, wherein randomly selecting the different ordering comprises swapping two program code segments in a previous ordering.

5. The method of claim 4, wherein the program code segments each comprise a module, and wherein randomly selecting the different ordering further comprises constraining selection of the two program code segments to modules in the same replaceable unit destination.

6. The method of claim 1, wherein selecting an ordering from among the plurality of orderings comprises testing a subset of orderings at each of a plurality of temperature values.

7. The method of claim 6, wherein selecting an ordering from among the plurality of orderings further comprises testing a subset of orderings at each temperature value.

8. The method of claim 7, wherein selecting an ordering from among the plurality of orderings further comprises accepting a change to an ordering if a calculated cost for such ordering is lower than that of a working ordering.

9. The method of claim 7, wherein selecting an ordering from among the plurality of orderings further comprises randomly accepting a change to an ordering even if the calculated cost for such ordering is not lower than that of the working ordering.

10. The method of claim 7, wherein selecting an ordering from among the plurality of orderings further comprises prematurely halting the testing of orderings based upon a halt criterion.

11. The method of claim 1, wherein the program code segments each comprise a module from an operating system kernel.

12. The method of claim 11, wherein each module comprises a high use module, and wherein selecting the ordering from among a plurality of orderings comprises generating a high use module list.

13. An apparatus, comprising:
a processor; and
first program code configured to be executed by the processor to optimize execution of second program code in a computer of the type including a multi-level memory architecture by using a heuristic algorithm to select an ordering from among a plurality of orderings for a plurality of program code segments in the second program code, wherein the heuristic algorithm comprises a simulated annealing algorithm, wherein the first program code is configured to select the ordering using the heuristic algorithm by testing a subset of the plurality of orderings, wherein the first program code is configured to test the subset of the plurality of orderings by, for each ordering in the subset, calculating a cost for such ordering based upon cache miss rates for such ordering, and wherein the first program code is configured to test the subset of orderings by randomly selecting a different ordering after testing an ordering from the subset of orderings.

14. The apparatus of claim 13, wherein the heuristic algorithm is configured to minimize cache misses in the computer.

15. The apparatus of claim 13, wherein the first program code is configured to randomly select the different ordering by swapping two program code segments in a previous ordering.

16. The apparatus of claim 15, wherein the program code segments each comprise a module, and wherein the first program code is configured to randomly select the different ordering by constraining selection of the two program code segments to modules in the same replaceable unit destination.

17. The apparatus of claim 13, wherein the first program code is configured to select an ordering from among the plurality of orderings by testing a subset of orderings at each of a plurality of temperature values, and testing a subset of orderings at each temperature value.

18. The apparatus of claim 17, wherein the first program code is configured to select an ordering from among the plurality of orderings by accepting a change to an ordering if a calculated cost for such ordering is lower than that of a working ordering.

19. The apparatus of claim 18, wherein the first program code is configured to select an ordering from among the plurality of orderings by randomly accepting a change to an ordering even if the calculated cost for such ordering is not lower than that of the working ordering.

20. The apparatus of claim 13, wherein the first program code is configured to select an ordering from among the plurality of orderings by prematurely halting the testing of orderings based upon a halt criterion.

21. The apparatus of claim 13, wherein the program code segments each comprise a module from an operating system kernel.

22. The apparatus of claim 21, wherein each module comprises a high use module, and wherein the first program code is configured to select the ordering from among a plurality of orderings by generating a high use module list.

23. A program product, comprising:
first program code configured to optimize execution of second program code in a computer of the type including a multi-level memory architecture by using a heuristic algorithm to select an ordering from among a plurality of orderings for a plurality of program code segments in the second program code, wherein the heuristic algorithm comprises a simulated annealing algorithm, wherein the first program code is configured to select the ordering using the heuristic algorithm by testing a subset of the plurality of orderings, wherein the first program code is configured to test the subset of the plurality of orderings by, for each ordering in the subset, calculating a cost for such ordering based upon cache miss rates for such ordering, and wherein the first program code is configured to test the subset of orderings by randomly selecting a different ordering after testing an ordering from the subset of orderings; and
a physical recordable computer readable medium bearing the first program code.

* * * * *